Feb. 15, 1966 C. V. ALLANDER 3,234,767

MAGNETICALLY OPERABLE LOCK

Filed Feb. 26, 1963 9 Sheets-Sheet 1

INVENTOR.
Claes Vilhelm Allander

BY Strauch, Nolan & Neale

ATTORNEYS

MAGNETICALLY OPERABLE LOCK

Filed Feb. 26, 1963 9 Sheets-Sheet 2

INVENTOR.
Claes Vilhelm Allander
BY
Strauch, Nolan & Neale
ATTORNEYS

MAGNETICALLY OPERABLE LOCK
Filed Feb. 26, 1963 9 Sheets-Sheet 3
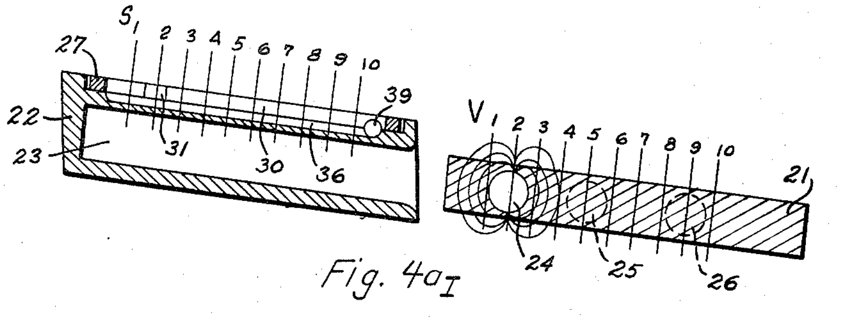
Fig. 4aI
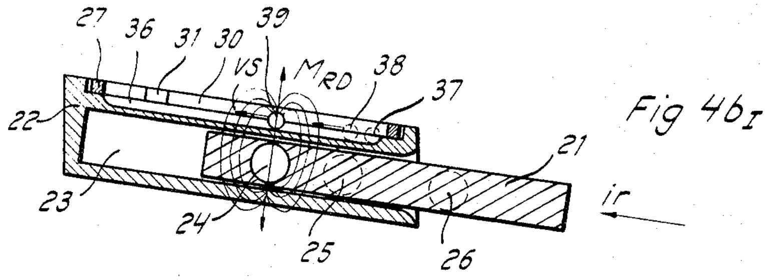
Fig 4bI
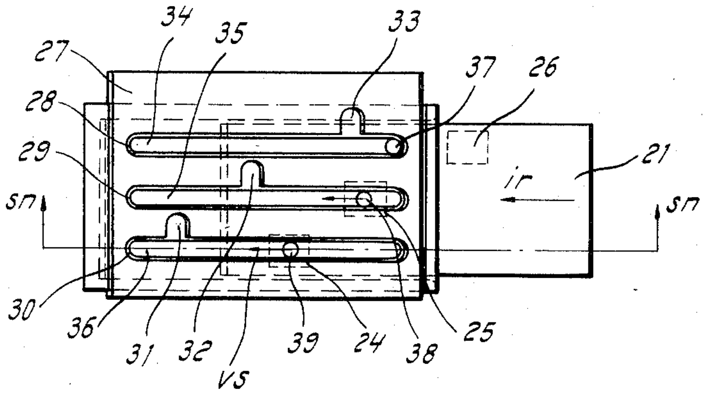
Fig. 4bII
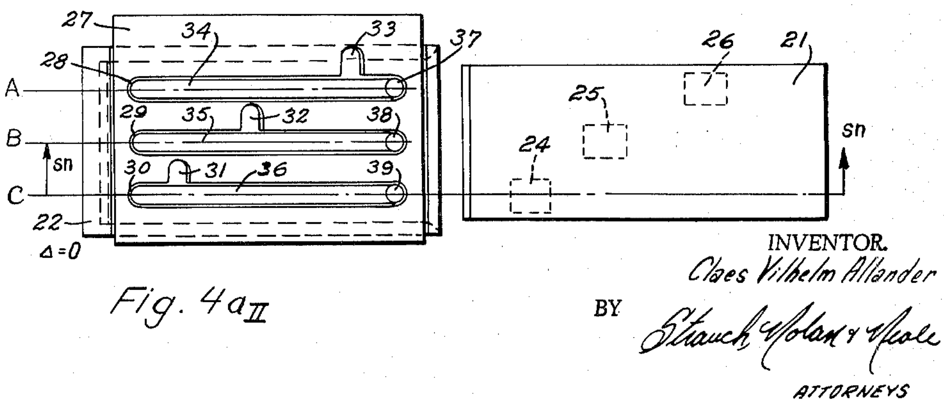
Fig. 4aII
INVENTOR.
Claes Vilhelm Allander
BY Stauch, Nolan & Neale
ATTORNEYS

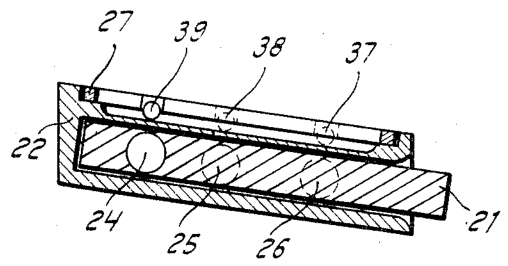
Fig. 4cI
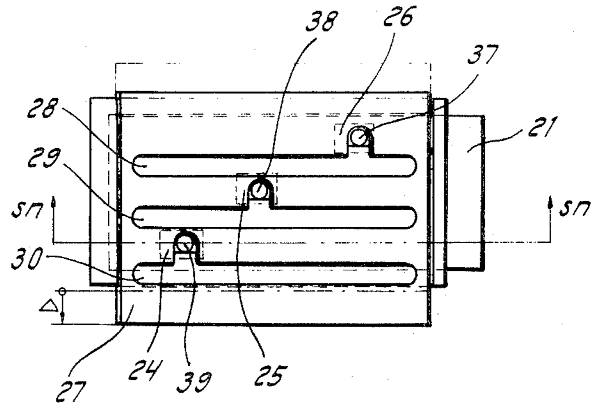
Fig. 4cII
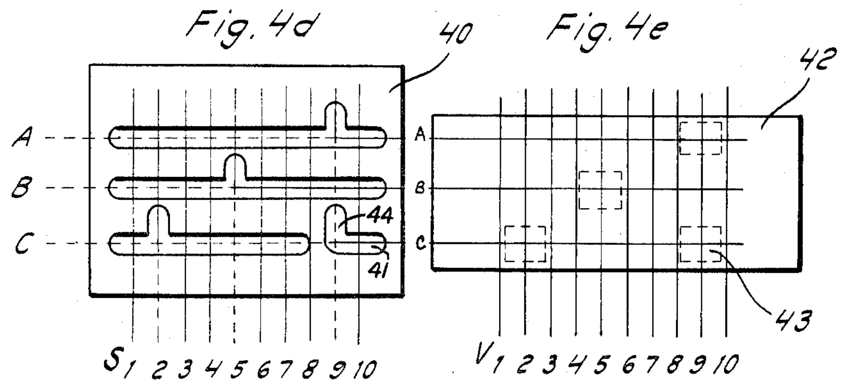
Fig. 4d, Fig. 4e
INVENTOR.
Claes Vilhelm Allander
BY
Strauch, Nolan & Neale
ATTORNEYS Feb. 15, 1966 C. V. ALLANDER 3,234,767
MAGNETICALLY OPERABLE LOCK
Filed Feb. 26, 1963 9 Sheets-Sheet 5
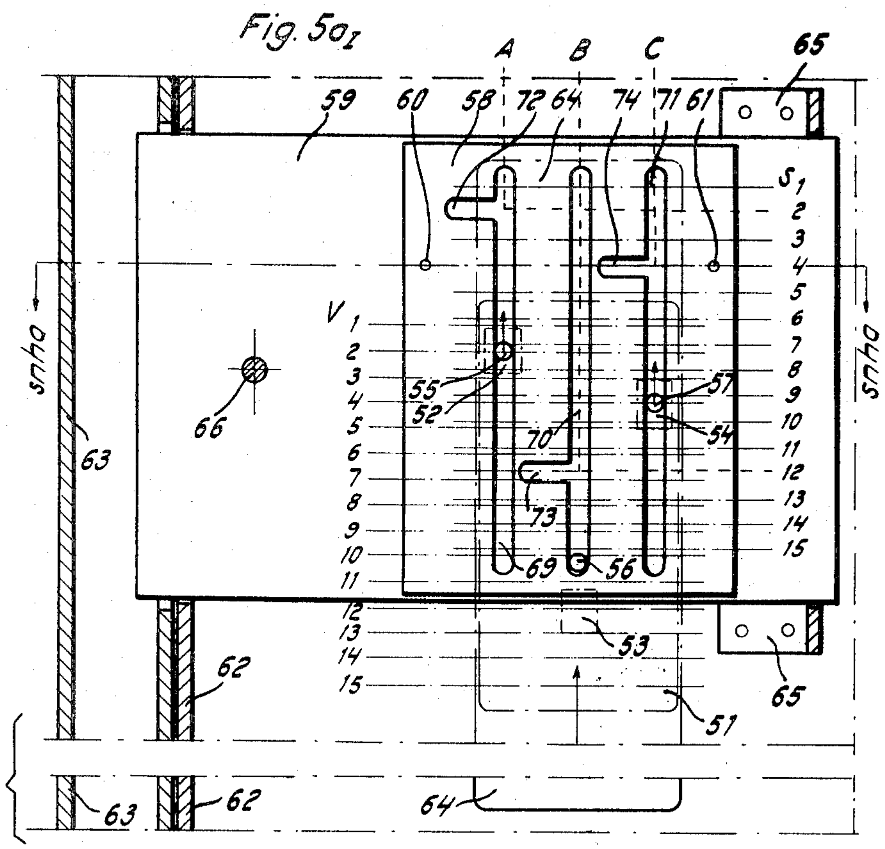
Fig. 5aI
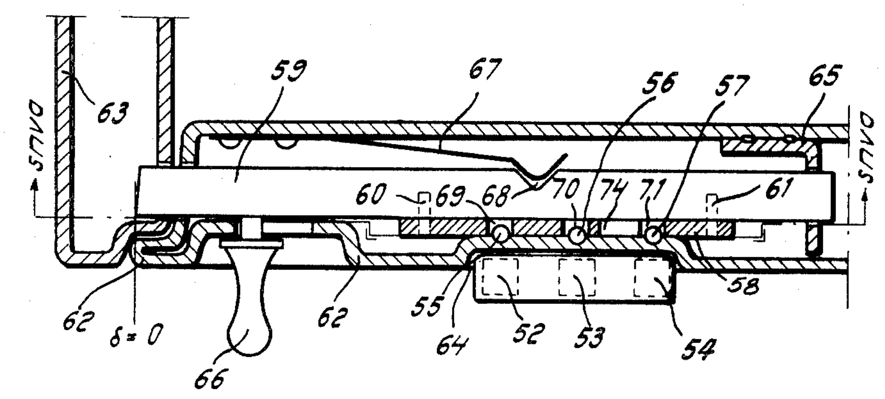
Fig 5aII
INVENTOR.
Claes Vilhelm Allander
BY Strauch Nolan & Neale
ATTORNEYS

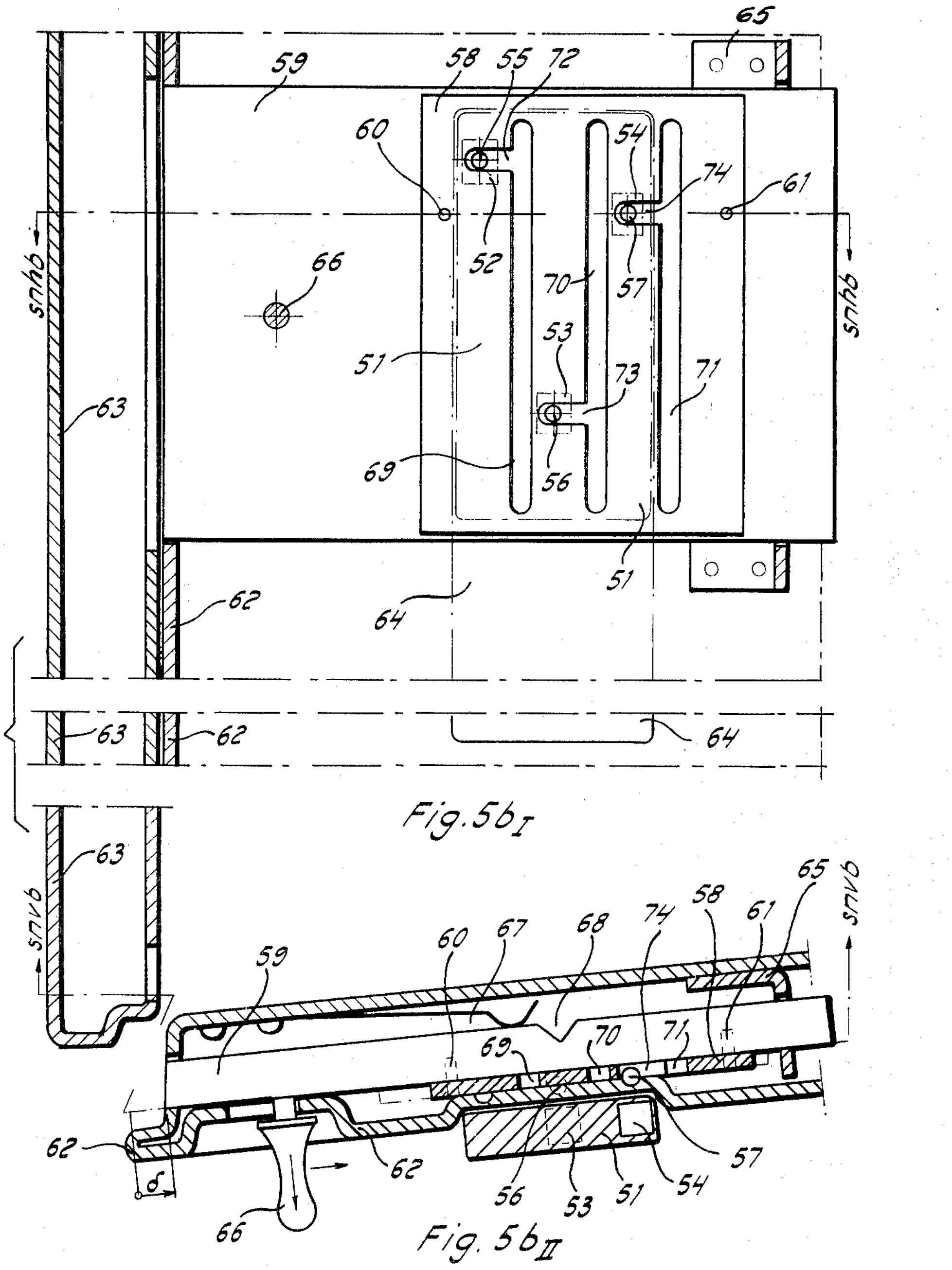
Fig. 5b_I, Fig. 5b_II
INVENTOR.
Claes Vilhelm Allander
BY
Strauch, Nolan & Neale
ATTORNEYS

MAGNETICALLY OPERABLE LOCK

Filed Feb. 26, 1963 9 Sheets-Sheet 7

INVENTOR.
Claes Vilhelm Allander
BY
Strauch, Nolan & Neale
ATTORNEYS

INVENTOR.
Claes Vilhelm Allander
BY
Strauch, Nolan & Neale
ATTORNEYS

Feb. 15, 1966 C. V. ALLANDER 3,234,767

MAGNETICALLY OPERABLE LOCK

Filed Feb. 26, 1963 9 Sheets-Sheet 9

INVENTOR
CLAES VILHELM ALLANDER

BY

Strauch, Nolan & Neale
ATTORNEYS 3,234,767

MAGNETICALLY OPERABLE LOCK

Claes Vilhelm Aliander, 4 Jarlaplan, Stockholm VA, Sweden

Filed Feb. 26, 1963, Ser. No. 261,172
Claims priority, application Sweden, Feb. 28, 1962, 2,190/62
7 Claims. (Cl. 70—276)

Figure 1A:
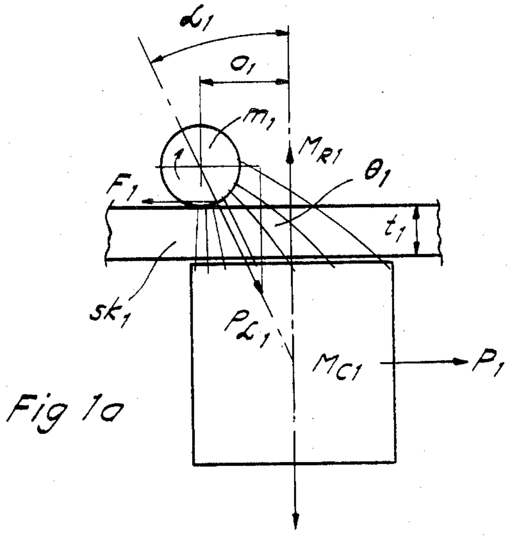

The present invention relates to a magnetically operable lock.

It is an object of the invention to provide a lock of this kind by which considerably larger number of combinations may be effected than in known magnetically operable locks containing the same number of magnetically operable blocking elements, thereby affording a better protection against burglary.

It is also an object of the invention to provide a magnetically operable lock which is of a simple and robust construction and which requires little space and is easy to manufacture.

According to the invention the lock comprises two osculating members which are movable relative to each other, for instance, plates which are movable along each other, or circular tubes mounted so that one tube can be rotated and/or displaced axially within the other tube. Magnetically operable blocking elements are mounted between these members. The blocking elements are movable under the influence of a magnetic key to predetermined positions in which they permit movement of one of said members relative to the other member, while in other positions they prevent such movement.

The blocking elements are of magnetic material and have the form of rolling bodies. Each blocking element is freely movable in a channel formed by a recess or groove in one of said members and a corresponding recess or groove in the other member. Thus each blocking element projects into both members. Said channels extend in a direction at angles to the direction of the relative movement of the two members. For each such channel there is provided in one of the members an additional groove or recess which extends in the direction of the relative movement of the two members. The blocking elements can be moved by means of the magnetic key to the points from where said additional recesses or grooves extend, and when they are in these positions they allow movement of one of said members relative to the other member, whereas when the blocking elements are in any other positions within their respective channels they prevent such movement.

The lock is provided with means permitting a key having magnet poles to be moved into a position in which the blocking elements are subjected to magnetic attraction from the magnetic poles, so that the blocking elements can be caused to assume the positions in which they allow the said two members to be moved relative to each other. The two members may be so mounted that the channels in which the blocking members are accommodated, are inclined with respect to the horizontal plane, whereby the blocking elements are caused by the action of gravity to assume predetermined initial positions when not acted upon by the key.

The invention can be applied to locks for all purposes, for instance, locks for doors, cupboards, safes, filing cabinets, bank depositories, refrigerators and electric equipment, telephone instruments, vending machines, money-boxes, motor cars and other kinds of vehicles, parking meters, furniture, bags, suit-cases, containers and boxes. The invention may also be utilized in padlocks.

The invention and its mode of operation will be described more in particular in conjunction with the accompanying drawings.

FIGS. 1*a*, 1*b*, 2*a*, 2*b* and 3 illustrate the interaction between a magnet pole and a blocking element in the novel magnetic lock.

Figure 1B:
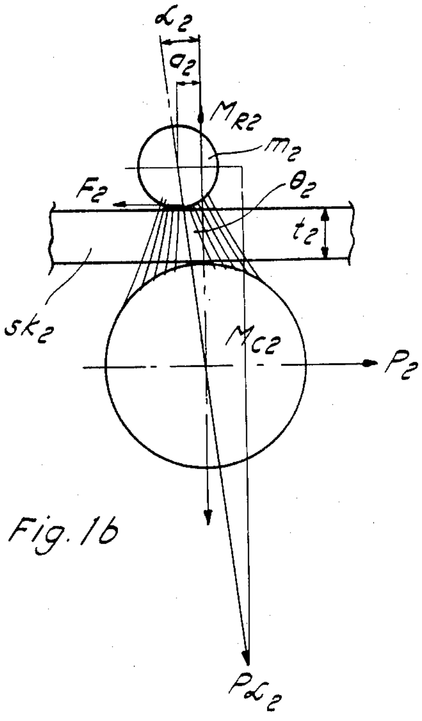

FIGS. 1*a* and 1*b* illustrate how the blocking element is acted upon by two different types of magnetic poles.

Figure 2A:
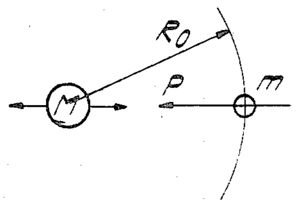
Figure 2B:
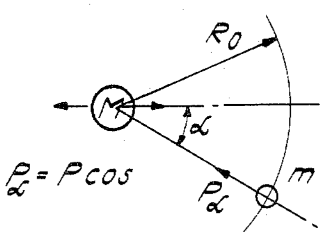

FIGS. 2*a* and 2*b* illustrate how the attraction force exerted by a small magnet upon a mass particle of magnetic material varies according to the direction of magnetization of the magnet.

Figure 3:
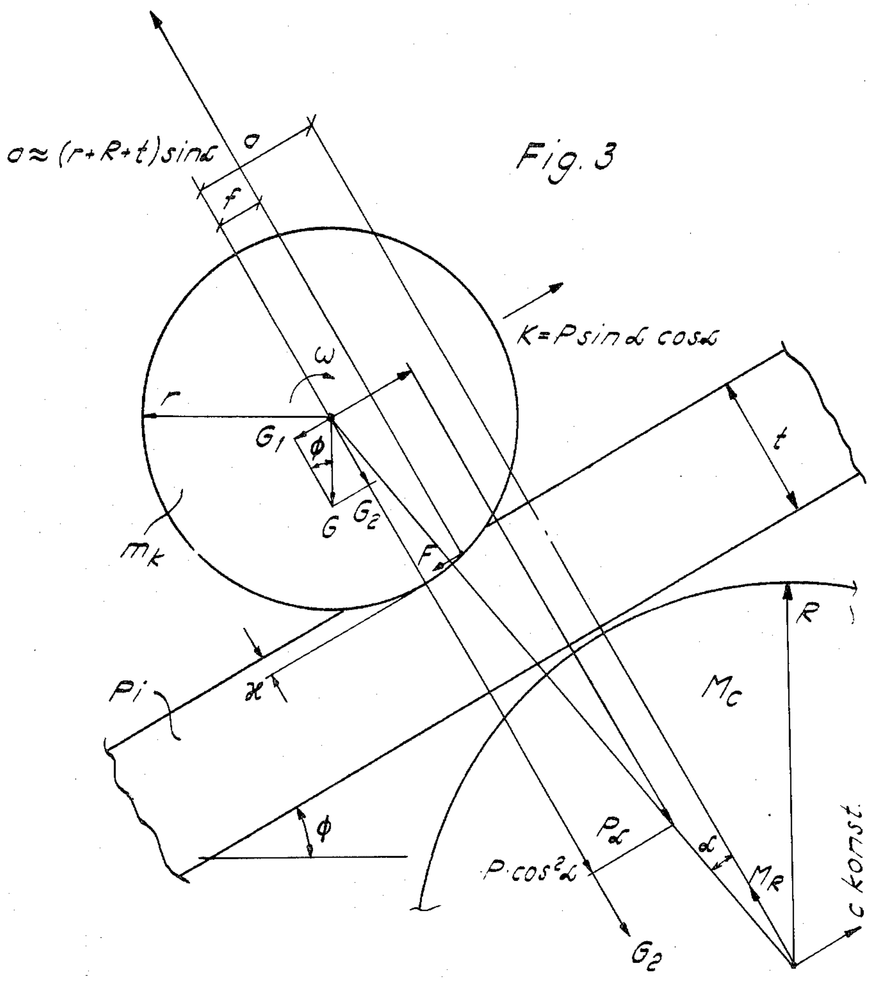

FIG. 3 illustrates the motion of a spherical blocking element subjected to forces from a cylindrical magnet which is magnetized in a diametrical direction.

FIGS. $4a_{I}$ and $4a_{II}$, $4b_{I}$ and $4b_{II}$, $4c_{I}$ and $4c_{II}$ and 4*d* and 4*e* show an embodiment of a magnetic lock mechanism. Only those parts of the mechanism are shown which are necessary for the understanding of the principle of the invention.

FIGS. $5a_{I}$ and $5a_{II}$, $5b_{I}$ and $5b_{II}$ show an embodiment of a lock mounted in a vertically hinged door.

Figure 6A:
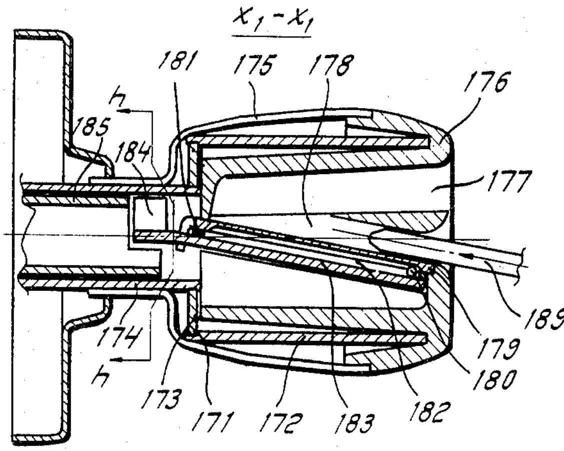

FIG. 6*a* shows an embodiment of the locking mechanism applied to a door knob.

Figure 6B:
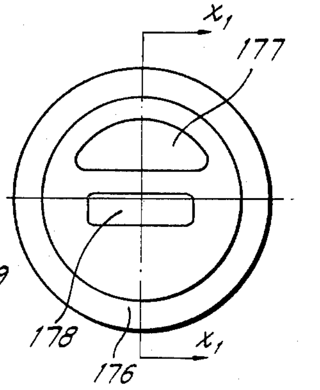

FIG. 6*b* shows the door knob of FIG. 6*a* in front view.

Figure 6C:
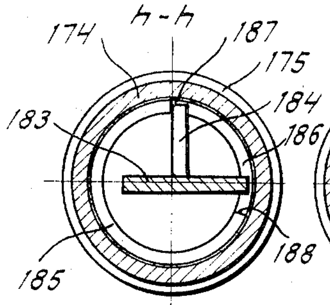
Figure 6D:
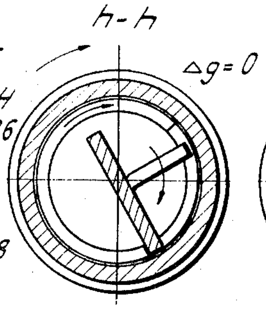
Figure 6E:
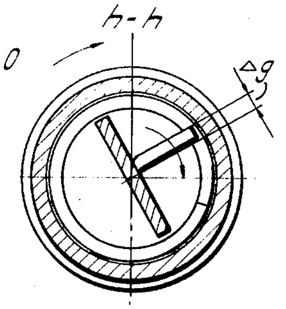

FIGS. 6*c*, 6*d* and 6*e* show three cross-sections through the door knob of FIG. 6*a* taken along line *h*—*h*. FIG. 6*c* illustrates the conditions before the knob has been turned. FIG. 6*d* illustrates conditions when the knob has been turned through an angle of 60 degrees in the case that the key has not been inserted or a wrong key has been inserted or the right key has been inserted in wrong position. FIG. 6*e* illustrates conditions in the case that the knob has been turned through an angle of 60 degrees with the right key in the right position.

Figure 6F:
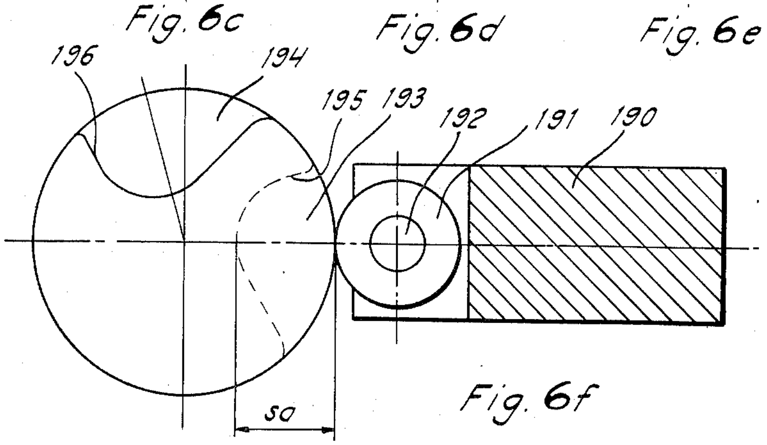

FIG. 6*f* illustrates a method of blocking and actuating the bolt combined with the lock mechanism shown in FIG. 6*a*.

Figures 7A, 7B, 7C, 7D, 8A, 8B:
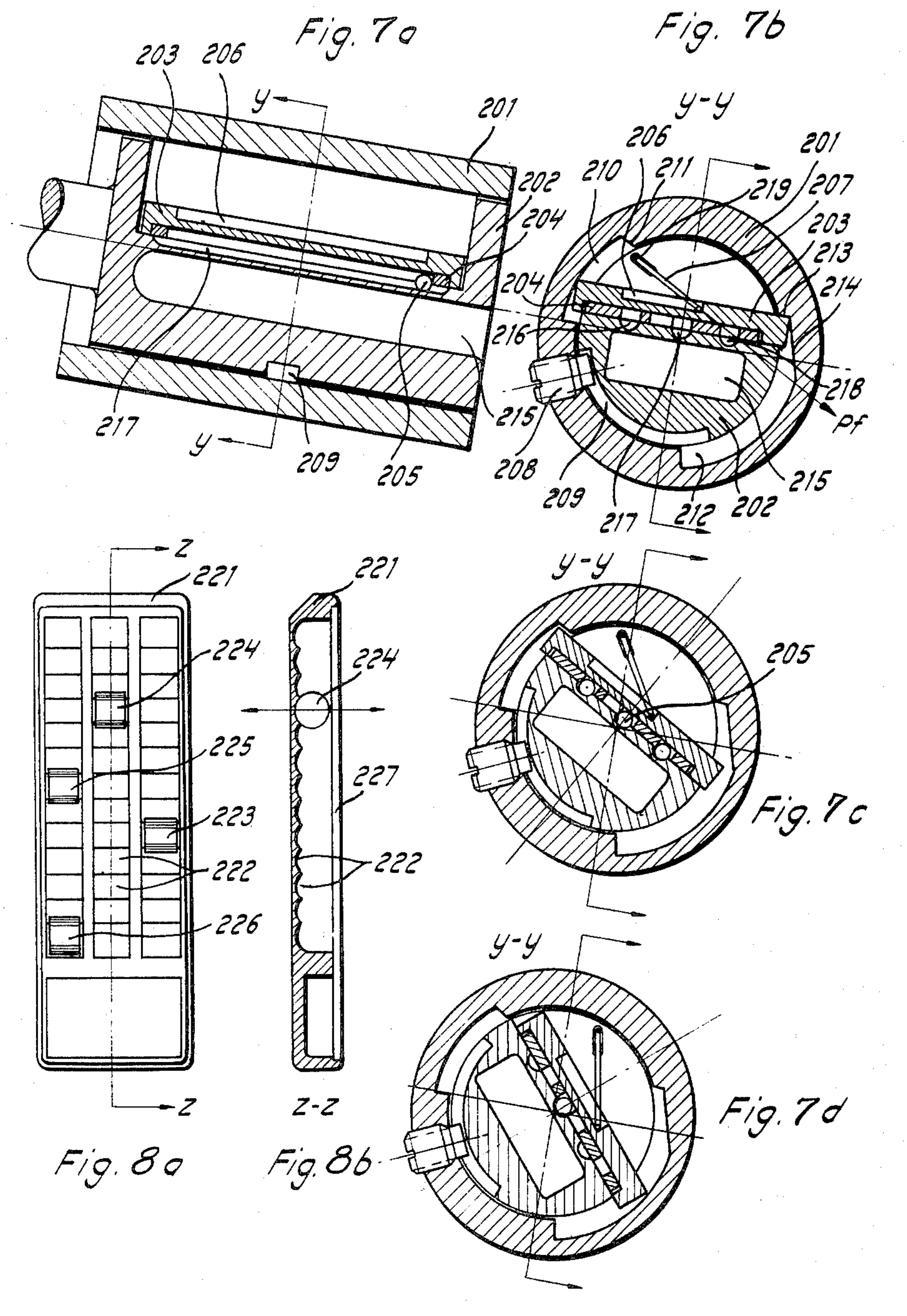

FIG. 7*a* shows in longitudinal section an embodiment of a magnetic lock of the cylinder type in which the locking and unlocking is effected by means of a displaceable plate.

FIGS. 7*b*, 7*c* and 7*d* show the lock of FIG. 7*a* in cross-section along line *y*—*y* in three different stages of the operation of the mechanism.

FIG. 8*a* shows an embodiment of a key in the form of a plate having permanent magnets mounted therein.

FIG. 8*b* shows the key in cross-section along line *z*—*z* in FIG. 8*a*.

Figure 9A:
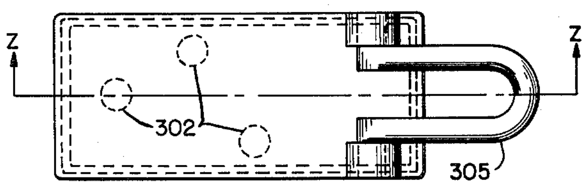

FIG. 9*a* shows another embodiment of the key including a single plate of magnetic material which has been magnetized at predetermined points to produce magnet poles.

Figure 9B:
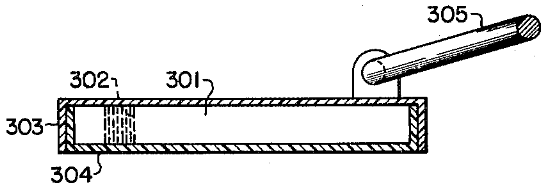

FIG. 9*b* shows the key of FIG. 9*a* in section along line Z—Z in FIG. 9*a*.

The principle of the interaction between a magnet pole and a blocking element is illustrated diagrammatically in FIGS. 1*a*, 1*b*, 2*a*, 2*b* and 3.

Referring now to FIG. 1*a*, $M_{C1}$ is a permanent magnet of cylindrical form and magnetized in the direction $M_{R1}$ of the axis of the cylinder. $sk_1$ is a plate with a thickness $t_1$ consisting of a non-magnetic material. A rolling body $m_1$ rests upon the plate $sk_1$ and is subjected to a magnetic force field $\theta_1$ from the permanent magnet $M_{C1}$ so that it is attracted by a force $P_{\alpha 1}$ acting along a line which forms the angle $\alpha_1$ with the direction $M_{R1}$ of the magnetization of the permanent magnet. For the sake of simplicity it is assumed that the resultant force $P_{\alpha 1}$ of the magnetic field coincides with a line through the centres of gravity of the rolling body $m_1$ and the permanent magnet $M_{C1}$.

When the magnet $M_{C1}$ is moved with a certain constant velocity in the direction of the arrow $P_1$ along the bottom side of plate $sk_1$ the rolling body $m_1$ will move behind the magnet $M_{C1}$ with a certain lag $a_1$ corresponding to a lag angle $\alpha_1$.

This mode of actuating the blocking elements is utilized in the magnetic lock according to the present invention. It is essential that the said lag is as small as possible. This can be attained by giving the poles of the magnet a suitable shape so as to produce a concentration of the effective magnetic field, so that the blocking elements can be moved with sufficient accuracy to the positions in which they permit unlocking.

FIG. 1*b* shows the same arrangement as FIG. 1*a* with the difference, however, that the direction $M_{R2}$ of the magnetization of the permanent magnet $M_{C2}$ is diametrical instead of axial. As will be seen from a comparison between FIGS. 1*a* and 1*b* this gives rise to a more concentrated magnetic field whereby the lag between the rolling body and the magnet is reduced as compared with the case illustrated in FIG. 1*a*.

FIGS. 2*a* and 2*b* show diagrammatically how a magnet M with a given direction of magnetization attracts a mass particle *m* situated at a distance $R_0$ from the magnet. In the case illustrated by FIG. 2*a* the particle *m* is situated in the direction of magnetization, and the attraction force is P, while in the case illustrated in FIG. 2*b* the particle *m* is situated at a point on a radius forming an angle $\alpha$ with the magnetization direction. In the latter case the particle is attracted by a force $P_a$ which is less than the force P. Approximately $P_a=P \cos \alpha$. In the case that the magnet is of small size the force acting between the magnet and the mass particle is inversely proportional to the square of the distance between the magnet and the particle.

FIG. 3 shows a rolling body $m_k$, for instance a ball having the radius *r* which is positioned at one side of a plate P*i* having the thickness *t* and forming an angle $\theta$ to the horizontal plane, and a magnet $M_C$ of cylindrical form with the radius R and the direction of magnetization $M_R$. The magnet is positioned at the opposite side of the plate P*i* and attracts the rolling body. When the magnet $M_C$ is moved along the plate with a constant velocity C and the translational velocity of the rolling body is also equal to C, the following forces are acting upon the rolling body: The gravitational force G, the attraction force $P_\alpha$ from the magnet $M_C$, the force component F of the rolling friction parallel to the direction of movement of the rolling body, and the reaction force $N_R$ exerted by the plate P*i* in a direction at right angles to the direction of movement of the rolling body. The force G can be replaced by the components $G_1$ and $G_2$, and the force $P_\alpha$ can be replaced by components $P_\alpha \cos \alpha=P \cos^2 \alpha$ and $K=P \sin \alpha \cos \alpha$. In FIG. 3 H designates an elastic deformation of the plate under the influence of the said forces, $\omega$ designates the angular velocity of the rolling body, *f* designates the coefficient of the rolling friction, $\alpha$ designates the angular lag of the rolling body, and *a* designates the absolute lag of the rolling body.

It will be seen that the following equation holds $$\frac{P}{G}=\frac{r \sin \phi+f \cos \phi}{r \sin \alpha \cos \alpha-f \cos^2 \alpha}$$

The practical implications of this equation will be illustrated by two numerical examples. It is assumed in both cases that the rolling body is a steel ball having a diameter of $\frac{1}{16}''=1.58$ mm. and having a weight of 0.0162 gram, that the magnet is a cylinder having the diameter 4.0 mm. and the length 3.5 mm. It is further assumed that the thickness *t* of the plate P*i* is 1 mm. and $f=0.01$ mm. The ratio $P/G$ is then approximately equal to 10.

In the first example it is assumed that the angle of inclination $\phi=0$ which means that the rolling body moves horizontally. Solution of the above equation for this value of $\phi$ gives the following result:

$$\alpha<1°;\ a<0.07 \text{ mm.}$$

In the second example it is assumed that $\phi=90°$ which means that the rolling body moves vertically. In this case the following result is obtained:

$$\alpha=6.5°,\ a=0.43 \text{ mm.}$$

This lag which must be considered in the design of the lock, can be compensated for by a suitable arrangement of the magnet poles in the key in relation to the corresponding grooves or recesses in the two relatively movable lock members.

An embodiment of a lock mechanism in accordance with the present invention is shown in FIGS. $4a_I$, $4a_{II}$, $4b_I$, $4b_{II}$, $4c_I$, $4c_{II}$, 4*d* and 4*e*. FIG. $4a_I$ is a longitudinal section taken along line *sn*—*sn* in FIG. $4a_{II}$. The mechanism consists of a hollow frame 22 of non-magnetic material having a recess 23 for receiving a key 21 which is provided with three magnets 24, 25 and 26. A locking member 27 in the form of a plate is associated with the frame 22 and is movable relative to the frame in a direction substantially at right angles to the direction of insertion for the key 21. The member 27 has three longitudinal slots 28, 29, 30 and three transversal slots 31, 32 and 33. The frame 22 is provided with three grooves 34, 35, 36 corresponding to the longitudinal slots 28, 29, 30 respectively in the member 27. Blocking elements in the form of three spherical rolling bodies 37, 38, 39 are mounted for movement in the channels formed by these slots and corresponding grooves.

The direction of magnetization for the magnets is indicated in FIG. $4a_I$ as regards magnet 24. The positions of the magnets in the key can be indicated by means of letters and numerals as appears from FIGS. $4a_I$ and $4a_{II}$, and the positions of the transversal slots 31, 32, 33 in member 27 can be indicated in the same manner. In the shown example the combination of positions should be indicated $A_9$, $B_5$, $C_2$, the letters and numerals designating coordinates in an orthogonal coordinate system.

In FIGS. $4a_I$, $4a_{II}$ the key is outside the lock and the spherical blocking elements are not actuated by the field from the key magnets. The member 27 cannot move in relation to the frame 22 unless the blocking elements are positioned in front of the respective transversal recesses 31, 32 and 33. The blocking elements can be caused to assume such positions only by the application of the right key to the lock.

FIGS. $4b_I$ and $4b_{II}$ show conditions during the insertion of key 21 in the recess 23, the direction of movement of the key being indicated by the arrow *ir*. The magnets 24 and 25 carry along the respective blocking elements 39 and 38 in a direction indicated by the arrow *vs* along the grooves 36 and 35 in frame 22 and slots 30 and 29 in the member 27, while the magnet 26 has not yet reached its corresponding blocking element 37 which therefore still is in its initial position. It will be realized that also in the conditions illustrated in FIGS. $4b_I$ and $4b_{II}$ a movement of the member 27 relative to the frame 22 is impossible.

FIGS. $4c_I$ and $4c_{II}$ show conditions when the key 21 has been completely inserted into the lock. The magnets 24, 25 and 26 have carried along their respective blocking elements 39, 38 and 37 to positions located in front of the slots 31, 32 and 33, and hereby it is possible to displace the lock member 27 with respect to the frame 22 as illustrated in FIG. $4c_{II}$ so as to open the lock. If the key is removed from the lock after the member 27 has been restored to its initial position, the blocking elements will follow the movement of the key until they have been returned to the initial position due to the attraction of the magnets. If the lock member 27 is restored to its initial position after the key has been removed, the blocking elements will be released and moved to an initial position for instance under the influence of gravity.

FIG. 4*d* shows an embodiment of a lock member 40 in the form of a plate having an additional longitudinal slot 41 and associated therewith an additional transversal slot 44. FIG. 4*e* shows the corresponding magnetic key 42 which has an additional magnet 43 as compared with the key shown in FIGS. 4*a*–4*c*. This arrangement prevents the opening of a lock by a testing (incomplete insertion) by means of a key which has the same number of magnets and the magnets arranged in the same positions relative to one another as in the correct key, but in which all the magnets are displaced in the direction of insertion in relation to the correct combination. In order to move a blocking element in the slot 41 to the transversal slot 44 (1 step) the key must be completely inserted into the lock, and only in this case the opening of the lock is possible. The combination of magnets in the key and the corresponding combination of transversal grooves in the lock member 40 can be designated in accordance with the system described above by A9, B5, C2, C9.

An embodiment of the lock mechanism described above is shown in FIGS. $5a_{I}$, $5a_{II}$, $5b_{I}$ and $5b_{II}$ applied to a door with a frame. FIGS. $5a_{I}$ and $5a_{II}$ show the door in locked condition, the key being just applied, while FIGS. $5b_{I}$ and $5b_{II}$ show the door unlocked.

The lock shown in FIGS. $5a_{I}$–$5b_{II}$ comprises a key 51 with magnets 52, 53 and 54, vertically movable blocking elements 55, 56, 57, a lock member 58 associated with a lock bolt 59 by means of pins 60, 61. The door is designated 62 and a frame or casing for the door is designated 63. The door 62 has a recess 64 for guiding the key. A bracket 65 is provided for guiding the lock bolt 59, and the bolt has attached thereto a knob 66. An initial position for the bolt 59 is defined by means of a spring 67 having a bent end engaging a recess 68 in the bolt.

FIG. $5a_{I}$ shows a vertical section taken along line *snva—snva* in FIG. $5a_{II}$, which is a horizontal section taken along line *snha—snha* in FIG. $5a_{I}$. FIGS. $5b_{I}$ and $5b_{II}$ are sections taken along lines *snvb—snvb* and *snhb—snhb* in FIGS. $5b_{II}$ and $5b_{I}$ respectively.

In FIGS. $5a_{I}$ and $5a_{II}$ the key 51 is shown moved to a position where the magnets 52 and 54 have caught and carried along the blocking elements 55 and 57, while the magnet 53 has not yet reached its blocking element 56. Thus, the bolt 59 is still in locking position engaging the frame 63. The spring 67 keeps the bolt 59 and the lock member 58 in such a position that the blocking elements are freely movable and cannot be obstructed by the walls in the slots 69, 70 and 71 of the block member 58.

FIGS. $5b_{I}$ and $5b_{II}$ show the lock in open condition, the door 62 being turned out of the frame 63 about a vertical hinge (not shown). The key 51 has been moved to its end position (open position) in the recess 64 of the door, and the blocking elements 55, 56 and 57 have assumed their unlocking positions in front of the respective transversal slots 72, 73 and 74 in the lock member 58. The bolt 59 has been pushed, for instance, by means of the knob 66, from its locking position to unlocking position thereby permitting the door to be opened. When the door is locked, the bolt 59 and the associated lock member 58 are moved to locking position, and if the key has been removed, the blocking elements are moved by the action of gravity to their initial positions. In FIG. $5a_{I}$ the blocking element 56 is shown in its initial position.

It is assumed that each of the blocking elements 55, 56, 57 can assume any of 15 positions, which corresponds to $15^3=3375$ different combinations. If the lock were provided with 6 blocking elements, each having 15 positions, the number of combinations would be $$15^6=11,390,625$$

The type of lock now described is particularly well adapted for mounting in thin doors, shutters, walls and the like, where the depth of the available space for the lock is small.

FIGS. 6*a*–6*f* illustrate an embodiment of the lock mechanism mounted in a door knob. The knob which possesses radial symmetry, is shown in front view in FIG. 6*b* as seen in a direction at right angles to the door. FIG. 6*a* shows a longitudinal section along the line $x_1$—$x_1$ in FIG. 6*b*. The knob comprises a casing 175 and a front portion 176 which is provided with apertures 177 and 178, the aperture 177 serving as a guide for the insertion of the key 189. The cover encloses a tube 172 which is attached by means of a collar 173 to a sleeve 174. The parts 172, 173 and 174 form together a frame designated 171. A plate 179 which is provided with grooves for guiding the spherical blocking elements, is rigidly attached to the frame 171 and is mounted with a certain inclination so that the blocking elements will take up a predetermined initial position under the action of gravity. One of the blocking elements 180 is visible in FIG. 6*a*. A locking member 181 having longitudinal slots one of which 182 is visible in FIG. 6*a*, is attached to a locking plate 183 which is movable in a direction at right angles to the said grooves and slots. Such movement is, however only possible in the case that all the blocking elements are in positions in front of transversal slots in the locking member 181.

FIGS. 6*c*–6*f* illustrate how the locking and unlocking movement of the knob is transferred to a lock bolt. FIG. 6*c* shows the initial position of the locking plate 183 and a tubular shaft 185 before the knob has been turned. FIG. 6*d* shows the positions of the same parts after the knob has been rotated through an angle of 60 degrees in the case that no key has been inserted in the lock or the right key has been inserted in a wrong position, or the wrong key has been inserted in the correct position. FIG. 6*e* shows the position of the same parts after the knob has been turned through an angle of 60 degrees with the right key in the right position. In the latter case the knob must be turned through a further angle of 45 degrees in order to withdraw the bolt completely. The end of the tubular shaft 185 is provided with a recess 186, and in the initial position shown in FIG. 6*c* a tongue 184 protruding from the locking plate 183 rests against an edge 187 of this recess. In this position of the locking plate 183 and the attached lock member 181 the longitudinal slots in member 181 are in alignment with corresponding longitudinal grooves in plate 179, so that the blocking elements are free to move in the channels formed by the slots and corresponding grooves. The tubular shaft 185 rests against a stop or shoulder under the action of a spring (the spring and stop is not shown in the figures) in the position indicated in FIG. 6*c*, and at the same time another spring (not shown) mounted between the locking plate 183 and the frame 171 keeps the tonque 184 of locking plate 183 in engagement with the edge 187 of the tubular shaft 185. If the knob is now turned in the direction indicated by arrows in FIG. 6*d* through an angle of 60 degrees, without any key being used, the locking plate 183 comes into engagement with the other edge 188 of the tubular shaft 185 so that if the turning of the knob is continued the tubular shaft 185 is also rotated. If, however, a key (189 in FIG. 6*a*) has been inserted in the knob before the knob is turned, the locking plate 183 is permitted to move transversely relative to the fixed plate 179, since the blocking elements are now positioned in front of the transversal slots in the member 181. Therefore during the first part of the rotation of the knob the tongue 184 is kept in engagement with the edge 187 during the movement of the locking plate 183 with respect to the frame, and when the locking plate 183 has reached its end position the contact between the tongue 184 and the edge 187 ceases. Due to the displacement of the locking plate 183 the tongue 184 will not come into engagement with the edge 188 if the rotation of the knob is continued as illustrated in FIG. 6*e*, so that in this case the tubular shaft 185 is not actuated but remains in its initial position.

FIG. 6*f* shows a method of utilizing the lock mechanism described with reference to FIGS. 6*a*–6*e* for actuating a lock bolt. The lock bolt is designated 190 at one end it carries a roller 181 mounted on a shaft 192. The roller 191 is in engagement with a cam 193 which is attached to the sleeve 174 (FIGS. 6*a*–6*e*). A similar cam 194 is mounted adjacent to and coaxially with cam 193 and is attached to the tubular shaft 185. The bolt 190 is kept in engagement with the cams by means of a spring or other means (not shown in the figure). The cams are provided with recesses 195 and 196.

In order that the bolt 190 shall be able to move from its locking position the recess 196 in the cam 193 must be brought into alignment with the recess 195 in cam 194. This is effected by turning the knob with the right key inserted, because the cam 194 then remains in its initial position while the cam 193 is rotated to such position that the recess 196 coincides with the recess 195.

In the embodiments of the invention described above the locking function has been effected directly by the magnetic blocking elements and the locking members coacting therewith. However, it may sometimes be desirable to let the blocking elements and the lock members coacting therewith only serve as links for transferring a locking or unlocking movement to a stronger locking member which performs the locking proper and is capable of withstanding large forces.

FIGS. 7*a*–7*d* show how this can be done.

FIG. 7*a* shows the lock mechanism in longitudinal section, and FIGS. 7*b*, 7*c* and 7*d* show the mechanism in cross-section along the line *y*—*y* in FIG. 7*a* during three different stages of operation.

The lock comprises an outer cylindrical frame 201, a barrel 202, a locking plate 203, a locking member 204, and three locking elements (balls). One of these blocking elements 205 is visible in FIG. 7*a* resting in its initial position. The locking plate has a recess 206 for a spring 207 which acts upon the locking plate in the direction of arrow *pf* as shown in FIG. 7*b*. A screw 208 is threaded into the frame and extends into a guiding groove 209 in the barrel. The purpose of this screw and groove is to prevent axial movement and to limit the rotation of the barrel relative to the frame. The internal side of the frame is provided with a longitudinal groove 210 having an edge 211 and another longitudinal groove 212 with a stop surface 213 and a guiding surface 214. The barrel has a key-hole 215 and grooves 216, 217 and 218 for the respective blocking elements and is also provided with a recess 219 for the spring 207.

Referring now to FIG. 7*c*, if the barrel 202 is rotated without a key being inserted in the lock, the lock plate 203 after having rotated through a certain angle will strike against the edge 211 inside the frame, thereby preventing continued rotation. If, however, a key has been inserted in the lock, which case is illustrated in FIG. 7*d*, the locking plate 203 during the first part of the rotation will be urged by spring 207 against the guiding surface 214, the locking plate is displaced laterally so that it does not come into engagement with the edge 211. Therefore continued rotation of the barrel is possible to the extent permitted by the length of groove 209 and the position of this groove in relation to the screw 208.

When the lock barrel is returned for locking the locking plate 203 is restored to its initial position by the action of the guiding surface 214 during the last portion of the return rotation, and the spring 207 is tensioned.

The rotation of the locking plate is stopped by the shoulder 213 in the frame.

FIGS. 8*a* and 8*b* show an embodiment of a key to be used in a lock according to the invention. A frame 221 is provided with recesses 222 for magnets 223, 224, 225 and 226 in the form of cylinders. The frame is provided with a covering plate 227 of a non-magnetic material which is fastened to the frame in any suitable manner. The frame of the key may also consist of a solid block of for instance a plastic in which case the key may be manufactured by injection moulding of the plastic in a mould containing the magnets. The key may also consist of a single plate of magnetic material which has been magnetized at predetermined points to produce the desired combination of magnet poles.

FIGURES 9*a* and 9*b* show a key of the last mentioned type. This key includes a solid plate or block 301 of magnetizable material enclosed in a cover 303–304 of a non-magnetic material, for instance plastics. One end of the cover carries a loop 305 for attaching the key to a keyring. The plate 301 is magnetized in a direction at right angles to the plate at limited areas as indicated by dotted lines 302.

What is claimed is:

1. A magnetically operable lock comprising two lock members which are in contact with each other and movable relative to each other, and blocking elements of magnetic material coacting with said lock members and being movable by means of a magnetic key to positions in which they enable movement of one of said lock members relative to the other lock member in one direction, while in other positions they prevent such movement, each of said lock members having a flat surface, the flat surface on one lock member facing the flat surface on the other lock member, each of said flat surfaces having a number of parallel oblong recesses, said lock members being so arranged in relation to each other that said recesses in one lock member coincide with corresponding recesses in the other lock member when the lock members are in locking position to form channels in which said blocking elements are freely movable, one of said lock members having additional recesses extending at an angle from the aforementioned recesses, and guiding means for said key enabling said key to be moved into a position in which the blocking elements are subjected to magnetic attraction from magnet poles of said key and enabling said key to be moved along the lock members in a direction parallel to said channels to a position in which said blocking elements are located in front of said additional recesses, thereby enabling movement of one of said lock members relative to the other lock member.

2. Magnetically operable lock as claimed in claim 1 in which the blocking elements are spherical.

3. Magnetically operable lock as claimed in claim 1 in which the magnet poles of the key are permanent magnets arranged in a predetermined pattern in a body of non-magnetic material.

4. Magnetically operable lock as claimed in claim 1 in which the key comprises a body of magnetic material which is magnetized at limited areas to produce separate magnet poles arranged in a predetermined pattern.

5. A magnetically operable lock as claimed in claim 1 in which one of said lock members is a fixed member and the other lock member is a movable plate, and in which said additional recesses extend at right angles to said channels.

6. Magnetically operable lock as claimed in claim 5 in which a lock bolt is attached to said movable plate.

7. Magnetically operable lock as claimed in claim 5 in which said lock members are mounted within a rotatable door knob and said fixed member is fixed in relation to the knob, and both lock members are mounted in an inclined position to cause the blocking elements to take up an initial position under the action of gravity, the lock further comprising a bolt operating mechanism linked with the knob by the movable lock member, and means exerting a force on the movable member to cause it to move relative to the fixed member when the knob is turned out of an initial position and the blocking elements are in the positions permitting said relative movement, thereby making the bolt operating mechanism effective.

References Cited by the Examiner

UNITED STATES PATENTS

| | | | |
|---|---|---|---|
| 2,121,301 | 6/1938 | Ractliffe | 70—276 |
| 2,177,996 | 10/1939 | Raymond | 70—386 |
| 2,648,729 | 8/1953 | Noregaard | 70—276 X |
| 2,931,953 | 4/1960 | Barney | 70—276 X |
| 3,111,834 | 11/1963 | Felson | 70—276 |

ALBERT H. KAMPE, *Primary Examiner.*